(12) United States Patent
Kim et al.

(10) Patent No.: US 10,123,093 B2
(45) Date of Patent: Nov. 6, 2018

(54) APPARATUS AND METHOD FOR TRANSMITTING AND RECEIVING 3DTV BROADCASTING

(71) Applicants: Electronics and Telecommunications Research Institute, Daejeon (KR); KOOKMIN UNIVERSITY INDUSTRY ACADEMY COOPERATION FOUNDATION, Seoul (KR)

(72) Inventors: Sung-Hoon Kim, Daejeon (KR); Hui Yong Kim, Daejeon (KR); Jooyoung Lee, Daejeon (KR); Jin Soo Choi, Daejeon (KR); Dong Wook Kang, Seoul (KR); Kyeong Hoon Jung, Seoul (KR)

(73) Assignees: Electronics and Telecommunications Research Institute, Daejeon (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 15/550,305

(22) PCT Filed: Feb. 5, 2016

(86) PCT No.: PCT/KR2016/001319
§ 371 (c)(1),
(2) Date: Aug. 10, 2017

(87) PCT Pub. No.: WO2016/129899
PCT Pub. Date: Aug. 18, 2016

(65) Prior Publication Data
US 2018/0027304 A1    Jan. 25, 2018

(30) Foreign Application Priority Data

Feb. 11, 2015 (KR) .................. 10-2015-0020917
Feb. 2, 2016 (KR) .................. 10-2016-0013097

(51) Int. Cl.
*H04N 7/52* (2011.01)
*H04N 21/81* (2011.01)
(Continued)

(52) U.S. Cl.
CPC ......... *H04N 21/816* (2013.01); *H04N 13/156* (2018.05); *H04N 13/161* (2018.05);
(Continued)

(58) Field of Classification Search
CPC ........................................ H04N 7/50
(Continued)

(56) References Cited

U.S. PATENT DOCUMENTS 9,288,466 B2    3/2016 Kim et al.
2003/0223499 A1*  12/2003 Routhier ............ H04N 13/341
                                                    375/240.25
(Continued)

FOREIGN PATENT DOCUMENTS

KR    1020080063323 A    7/2008
KR    1020110088334 A    8/2011
(Continued)

OTHER PUBLICATIONS

ATSC 3.0 Video Signaling, Aug. 3, 2015, LG Electronics Inc.
(Continued)

*Primary Examiner* — Dominic D Saltarelli
(74) *Attorney, Agent, or Firm* — William Park & Associates Ltd.

(57) ABSTRACT

An apparatus for transmitting 3DTV broadcasting generates base video data by coding additional video, generates
(Continued)

enhanced layer data by coding a correlation video between the base video and a video decodable from the base layer stream, and transmits the base layer data and the enhanced layer data.

19 Claims, 4 Drawing Sheets

(51) Int. Cl.
    *H04N 19/30* (2014.01)
    *H04N 19/597* (2014.01)
    *H04N 13/167* (2018.01)
    *H04N 13/156* (2018.01)
    *H04N 13/194* (2018.01)
    *H04N 13/356* (2018.01)
    *H04N 13/161* (2018.01)
    *H04N 21/2343* (2011.01)
    *H04N 19/59* (2014.01)

(52) U.S. Cl.
    CPC ......... *H04N 13/167* (2018.05); *H04N 13/194* (2018.05); *H04N 13/356* (2018.05); *H04N 19/30* (2014.11); *H04N 19/59* (2014.11); *H04N 19/597* (2014.11); *H04N 21/2343* (2013.01)

(58) Field of Classification Search
    USPC ........................................ 375/240.12, 240.14
    See application file for complete search history.

(56) References Cited

U.S. PATENT DOCUMENTS

| | | | |
|---|---|---|---|
| 2005/0084006 A1* | 4/2005 | Lei ....................... | H04N 19/597 375/240.1 |
| 2010/0141738 A1 | 6/2010 | Lee et al. | |
| 2010/0165077 A1 | 7/2010 | Yin et al. | |
| 2011/0181693 A1 | 7/2011 | Lee et al. | |
| 2012/0320168 A1 | 12/2012 | Yun et al. | |
| 2014/0307049 A1 | 10/2014 | Kim et al. | |
| 2014/0307806 A1* | 10/2014 | Suh ....................... | H04N 19/597 375/240.26 |
| 2015/0020131 A1 | 1/2015 | Choi et al. | |
| 2016/0150237 A1 | 5/2016 | Kim et al. | |

FOREIGN PATENT DOCUMENTS

| | | |
|---|---|---|
| KR | 1020110092451 A | 8/2011 |
| KR | 1020160062716 A | 6/2016 |
| WO | 2011108903 A2 | 9/2011 |
| WO | 2012064123 A2 | 5/2012 |
| WO | 2013108954 A1 | 7/2013 |

OTHER PUBLICATIONS

ATSC Working Draft: A/341, Video, ATSC Doc. 534-168r2, Nov. 9, 2015, Advanced Television Systems Committee, Washington, D.C., USA.

ATSC3.0 Fixed/Mobile Hybrid UHD 3DTV System, Mar. 26, 2015, LG Electronics Inc. /Electronics and Telecommunications Research Institute.

* cited by examiner

APPARATUS AND METHOD FOR TRANSMITTING AND RECEIVING 3DTV BROADCASTING

TECHNICAL FIELD

The present invention relates to an apparatus for transmitting and receiving 3DTV (three-dimensional television) broadcasting. More particularly, the present invention relates to an apparatus for transmitting and receiving 3DTV broadcasting capable of providing 3DTV service without additional data for an additional video while maintaining compatibility with a scalable video decoder of a legacy receiver in an in-band mobile broadcasting system using a scalable video coder.

BACKGROUND ART

Scalable video coding is a coding scheme developed to provide multimedia content for various networks and user environments. The scalable video coding scheme codes video information using scalable method to support various resolutions, video quality, frame rates, or the like, with one bit stream, wherein a receiving terminal selectively extracts some or all of a bit stream in accordance with a receiving condition, and decodes video information for a user environment.

When the scalable video coding scheme is applied to a broadcasting/communication service, for providing a scalable 2D (two-dimensional) service, view video data of a low resolution and a high resolution of the same view are separated into a base layer and an enhancement layer, and data of the base layer and the enhancement layer are transmitted through a broadcasting network and/or a communication network. Thus, broadcasting and communication video services may be provided according to a receiving environment to a user.

Meanwhile, an existing fixed and mobile broadcasting convergent 3DTV scheme is more efficient in a simulcast-based broadcasting environment in which a base video and an additional video are independently coded, respectively, and are simultaneously broadcast to a fixed TV channel and a mobile TV channel, respectively. Such scheme may provide 3DTV service while satisfying backward compatibility with an existing 2D broadcast service without additional bandwidth allocation by transmitting the base video and the additional video through the fixed TV channel and the mobile TV channel, respectively, in the in-band mobile broadcasting system.

However, the existing fixed and mobile broadcasting convergent 3DTV scheme is available only in a simulcast-based broadcasting system that transmits both the base video and the additional video corresponding to a different view with the base video. Thus, the in-band mobile broadcasting system based on scalable video coding can't provide 3DTV service without the additional video corresponding to a different view with the base video. That is, the scalable video coding scheme that hierarchically transmits the same view data in a scalable manner is efficient in providing 2D service in a broadcasting and communication video service environment, but is not possible in the convergent 3DTV service that requires video data of different views such as the base video and the additional video.

DISCLOSURE

Technical Problem

The present invention has been made in an effort to provide a method and an apparatus for transmitting and receiving 3DTV broadcasting having advantages of providing stereoscopic 3DTV service as a convergent 3DTV without additional data for an additional (or base) video while maintaining compatibility with a scalable video decoder of a receiver in an in-band mobile broadcasting system using a scalable video coder.

Technical Solution

An exemplary embodiment of the present invention provides a method for transmitting 3DTV broadcasting by an apparatus for transmitting 3DTV broadcasting. The method for transmitting 3DTV broadcasting includes: generating base video data by coding the additional video; generating enhanced layer data by coding a correlation video between the base video and a video decodable from the base layer stream; and transmitting the base layer data and the enhanced layer data.

The generating of base video data may include coding after downsampling the additional video, and the generating of enhanced layer data may include generating the correlation video after upsampling the video decodable from the base layer data.

The transmitting of the base layer data and the enhanced layer data may include: converting the base layer data and the enhanced layer data into at least one transmission stream; and transmitting the at least one transmission stream.

The transmitting of at least one transmission stream may include: transmitting a transmission stream corresponding to the base layer data to a mobile TV channel; and transmitting a transmission stream corresponding to the enhanced layer data to a fixed TV channel of a broadcasting network.

The transmitting of at least one transmission stream may include modulating the at least one transmission stream using a predetermined modulation scheme.

The method for transmitting 3DTV broadcasting may further include: selecting one of a left video and a right video having different views as the base video; and selecting the other of the left video and the right video as the additional video.

Another exemplary embodiment of the present invention provides a method for receiving 3DTV broadcasting by an apparatus for receiving 3DTV broadcasting. The method for receiving 3DTV broadcasting includes: receiving a base layer data in which an additional video is coded; receiving enhanced layer data in which a correlation video between a base video and a video decodable from the base layer stream is coded; obtaining the additional video by decoding the base layer data; obtaining the correlation video by decoding the enhanced layer data; obtaining the base video using the additional video and the correlation video; and providing a broadcasting service using at least one of the additional video and the base video.

The receiving of base layer data may include receiving the base layer data through a first transmission channel, and the receiving of the enhanced layer data may include receiving the enhanced layer data through a second transmission channel.

The providing of a broadcasting service may include providing a 3D video by synthesizing the additional video and the base video.

The providing of a broadcasting service may include providing a 2D video using the additional video or the base video.

One of a left video and a right video having different views may be selected as the base video, and the other of the left video and the right video may be selected as the additional video.

Yet another exemplary embodiment of the present invention provides an apparatus for transmitting 3DTV broadcasting. The apparatus for transmitting 3DTV broadcasting includes a scalable coder, and a transmitter. The scalable coder generates base video data by coding the additional video, and generates enhanced layer data by coding a correlation video between the base video and a video decodable from the base layer stream. The transmitter converts the base layer data and the enhanced layer data into at least one transmission stream to transmit the at least one transmission stream.

The apparatus for transmitting 3DTV broadcasting may further include a multiplexer multiplexing the base layer data and the enhanced layer data, and delivering the multiplexed data to the transmitter.

The apparatus for transmitting 3DTV broadcasting may further include a downsampling converter downsampling the additional video, and delivering the downsampled additional video, wherein the scalable coder may perform upsampling of the video decodable from the base layer data, and then may generate the correlation video.

The transmitter may convert the base layer data and the enhanced layer data into different transmission streams.

The transmitter may transmit a transmission stream corresponding to the base layer data to a mobile TV channel of a mobile network, and may transmit a transmission stream corresponding to the enhanced layer data to a fixed TV channel of a broadcasting network.

The apparatus for transmitting 3DTV broadcasting may further include a video selector that selects one of left video and right video having different views as the base video, and selects the other of the left video and the right video as the additional video.

Yet another exemplary embodiment of the present invention provides an apparatus for receiving 3DTV broadcasting. The apparatus for receiving 3DTV broadcasting includes a receiver, a scalable decoder, and a reproducer. The receiver receives base layer data in which an additional video is coded, and enhanced layer data in which a correlation video between a base video and a video decodable from the base layer stream is coded. The scalable decoder decodes at least one of the base layer data and the enhanced layer data to obtain at least one video. The reproducer provides a broadcasting service using the at least one obtained video.

The scalable decoder may obtain the additional video by decoding the base layer data, may obtain the correlation video by decoding the enhanced layer data, and may obtain the base video using the additional video and the correlation video.

The reproducer may provide a 3D video by synthesizing the additional video and the base video or may provide a 2D video using the additional video or the base video.

Effects of Invention

According to the exemplary embodiment of the present invention, since the 3D contents required for the convergent 3DTV service in broadcasting service environments using a scalable coder may be efficiently generated and transmitted, a broader broadcasting service than the existing service method that is possible with only 2D service may be provided. Furthermore, the 3D service may be provided as a combination of various resolutions depending on a service model of a broadcasting company.

In addition, the synthesization scheme according to the exemplary embodiment of the present invention is applicable to all fields to which the scalable video coding/decoding scheme such as the converged 3DTV broadcast environment, all broadcasting/communication media, video storage media such as DVD and Blu-ray disc, and service environments through a file or the like, is applied.

MODE FOR INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and the claims, unless explicitly described to the contrary, the word "comprise" and variations such as "comprises" or "comprising", will be understood to imply the inclusion of stated elements but not the exclusion of any other elements.

Next, an apparatus and a method for transmitting and receiving 3DTV broadcasting according to an exemplary embodiment of the present invention will be described in detail with reference to the accompanying drawings.

Figure 1:
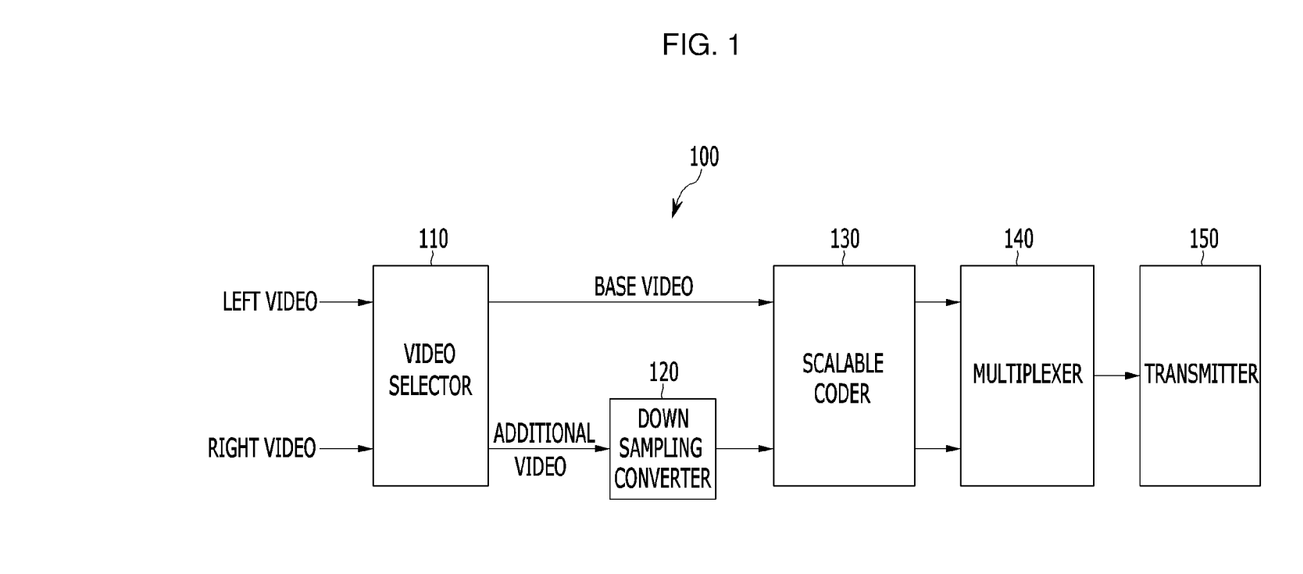
FIG. 1 is a view showing an apparatus for transmitting 3DTV broadcasting according to an exemplary embodiment of the present invention.
Figure 2:
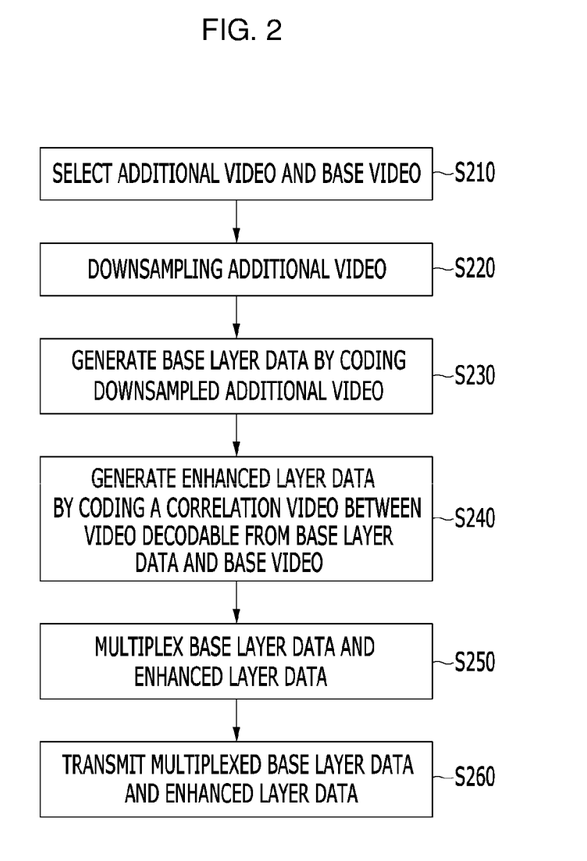
FIG. 2 is a flowchart showing a method for transmitting 3DTV broadcasting according to an exemplary embodiment of the present invention.

FIG. 1 is a view showing an apparatus for transmitting 3DTV broadcasting according to an exemplary embodiment of the present invention, and FIG. 2 is a flowchart showing a method for transmitting 3DTV broadcasting according to an exemplary embodiment of the present invention.

Contents transmitted by the apparatus 100 for transmitting 3DTV broadcasting shown in FIG. 1 may be videos, motion pictures, texts, or the like, and particularly, a three-dimensional (3D) video among the videos may include a left video and a right video each having a different view. One of the left video and the right video may be used as a base video, and the other thereof may be used as an additional video. The additional video may mean a video used in order to pair with a base video to configure one 3D video.

Referring to FIG. 1, the apparatus 100 for transmitting 3DTV broadcasting includes a video selector 110, a downsampling converter 120, a scalable coder 130, a multiplexer 140, and a transmitter 150.

Referring to FIG. 2, the video selector 110 selects the additional video and the base video (S210). The video selector 110 selects one of the left video and the right video as the additional video, and delivers the additional video to the downsampling converter 120. The video selector 110 selects the other of the left video and the right video as the base video, and delivers the base video to the scalable coder 130. For example, the left video may be selecteds the base video, and the right video may be selected as the additional video. Alternatively, the right video may be selected as the base video, and the left video may be selected as the additional video.

The downsampling converter 120 performs downsampling of the additional video, and delivers the downsampled additional video to the scalable coder 130 (S220). The left video and the right video may ne video having an ultra high definition (UHD) resolution, and the resolution of the additional video may be downsampled into an HD resolution.

The scalable coder 130 generates base layer data and enhanced layer data by coding the downsampled additional video and the base video using a modified scalable coding scheme. Here, the modified scalable coding scheme may mean a scheme that modifies scalable high efficiency video coding (SHVC). That is, the scalable coder 130 generates the base layer data by coding the downsampled additional video (S230), and generates the enhanced layer data by coding a correlation video between a video decodable from the base layer data and the base video (S240). The correlation video may mean video generated using the video (i.e., additional image) decodable from the base layer stream and the base video. For example, the correlation video may be a differential video corresponding to different information between the video decodable from the base layer data and the base video. Since the additional video is downsampled, and then delivered to the scalable coder 130, a difference in resolution between the downsampled additional video and the base video may occur. Thus, in order to correct the difference in resolution between the downsampled additional video and the base video, the scalable coder 130 performs upsampling of the video decodable from the base layer data, and then compresses the differential video between the upsampled video and the base video to generate the enhanced layer data.

Generally, the SHVC scheme generates the base layer data and the enhanced layer data using one video (2D video). On the other hand, the modified scalable coding scheme according to the exemplary embodiment of the present invention generates the base layer data and the enhanced layer data using different video, that is, the additional video and the base video.

As described above, when the apparatus 100 for transmitting 3DTV broadcasting use the modified scalable coding scheme, even if the apparatus 100 for transmitting 3DTV broadcasting does not transmit the base video, an apparatus for receiving 3DTV broadcasting may acquire the base video using the base layer data and the enhanced layer data.

Since the modified scalable coding scheme used in the scalable coder 130 is the same as the SHVC scheme, except that the base video is used to generate the enhanced layer data, the detailed description of a hardware structure of the scalable coder 130 will be omitted.

The multiplexer 140 multiplexes the base layer data and the enhanced layer data (S250).

The transmitter 150 transmits the base layer data and the enhanced layer data multiplexed by the multiplexer 140 (S260). The transmitter 150 converts the base layer data and the enhanced layer data into at least one transmission stream, and transmits the at least one transmission stream. Here, the transmission stream may be called a physical layer pipe (PLP) stream. Furthermore, the transmission stream may be called a different term according to a type of transmission network. For example, when the base layer data and the enhanced layer data are converted into different transmission streams, respectively, the transmission stream corresponding to the base layer data may be transmitted to a mobile TV channel of a mobile network, and the transmission stream corresponding to the enhanced layer data may be transmitted to a fixed TV channel of a broadcasting network. Alternatively, when the base layer data and the enhanced layer data are converted into one transmission stream, the base layer data and the enhanced layer data may be transmitted to the same network. The transmitter 150 may modulate the at least one transmission stream using a determined modulation scheme, and may transmit the modulated transmission stream. The transmitter 150 may modulate each transmission stream using different modulation schemes when the base layer data and the enhanced layer data are converted into different transmission streams, respectively. For example, the transmission stream corresponding to the base layer data is modulated according to a QPSK or 16-QAM scheme in which the reception performance is relatively excellent, and the transmission stream corresponding to the enhanced layer data is modulated according to a 256-QAM scheme in which the transmission efficiency is higher.

Figure 3:
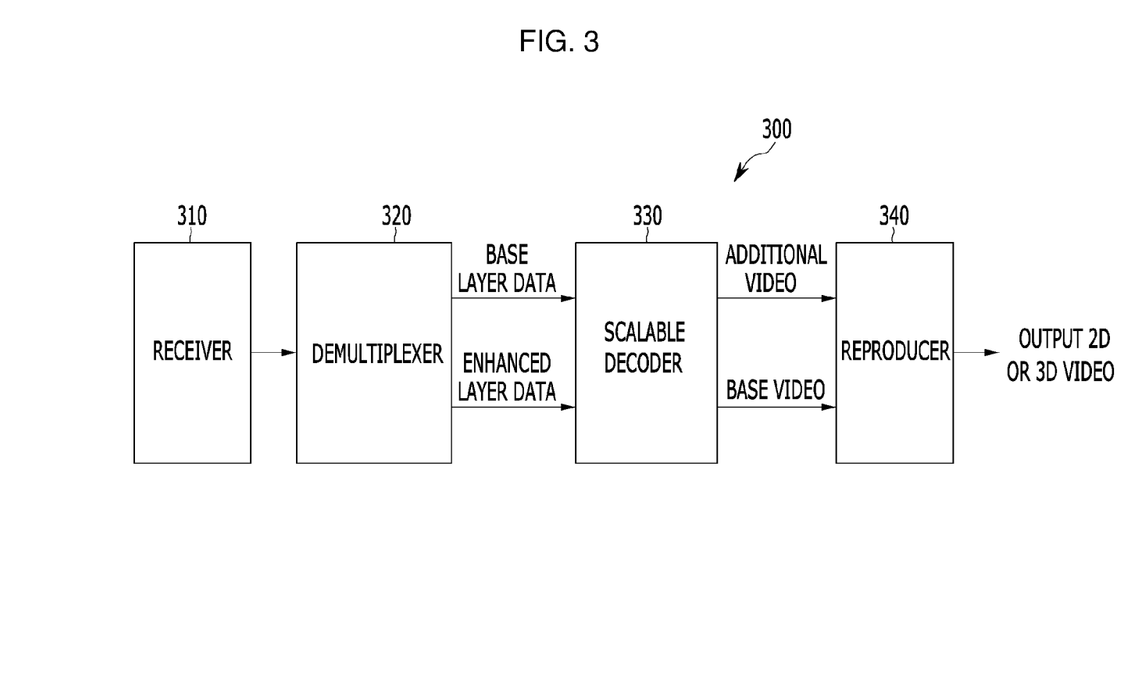
FIG. 3 is a view showing an apparatus for receiving 3DTV broadcasting according to an exemplary embodiment of the present invention.
Figure 4:
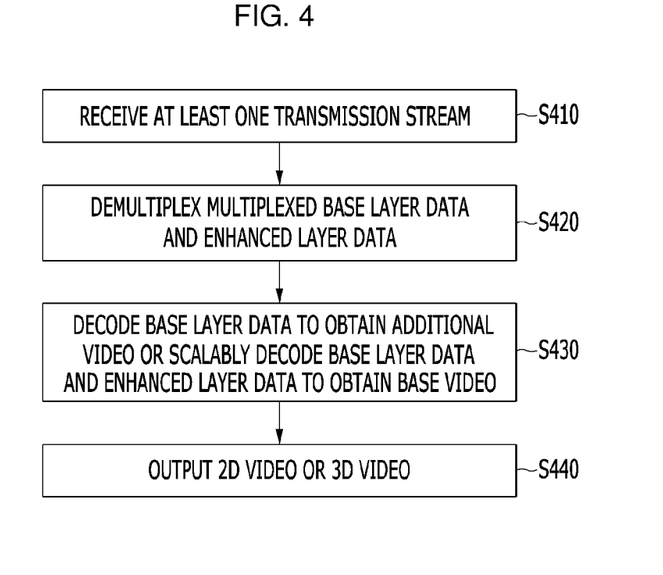
FIG. 4 is a flowchart showing a method for receiving 3DTV broadcasting according to an exemplary embodiment of the present invention.

FIG. 3 is a view showing an apparatus for receiving 3DTV broadcasting according to an exemplary embodiment of the present invention, and FIG. 4 is a flowchart showing a method for receiving 3DTV broadcasting according to an exemplary embodiment of the present invention.

Referring to FIG. 3, the apparatus 300 for receiving 3DTV broadcasting includes a receiver 310, a demultiplexer 320, a scalable decoder 330, and a reproducer 340.

Referring to FIG. 4, the receiver 310 receives at least one transmission stream transmitted from the apparatus 100 for transmitting 3DTV broadcasting (S410), demodulates the at least one transmission stream, and delivers the demodulated stream to the demultiplexer 320.

The demultiplexer 320 demultiplexes the base layer data and the enhanced layer data multiplexed by the apparatus 100 for transmitting 3DTV broadcasting to separate the base layer data and the enhanced layer data (S420).

The scalable decoder 330 may decode the base layer data to obtain the additional video, or may scalably decode the base layer data and the enhanced layer data to obtain the base video (S430). The scalable decoder 330 may obtain the additional video and the correlation video by decoding the base layer data and the enhanced layer data in a scalable video decoding scheme, and may generate the base video using the additional video and the correlation video. The above-mentioned differential video may be used as the correlation video. The scalable video decoding scheme may include an SHVC decoding scheme or an HEVC decoding scheme. The scalable decoder 330 that use the HEVC decoding scheme may decode only the base layer data.

The reproducer 340 outputs a 2D video using only the obtained additional video, or outputs a 3D video using the obtained additional video and base video (S440).

For example, when the apparatus 300 for receiving 3DTV broadcasting is a mobile receiver, the mobile receiver may obtain the additional video from the base layer data transmitted to the mobile TV channel of the mobile network, and may provide a mobile 2D service from the additional video. As described above, when the apparatus 300 for receiving 3DTV broadcasting is a mobile receiver, since the mobile receiver only receives and decodes the base layer data, another decoder capable of decoding the base layer data may be used instead of the scalable decoder 330.

Alternatively, when the apparatus 300 for receiving 3DTV broadcasting is a fixed receiver, the fixed receiver may obtain the additional video from the base layer data transmitted to the mobile TV channel of the mobile network, may obtain the correlation video using the enhanced layer data transmitted to the fixed TV channel of a fixed network, and then may obtain the base video using the obtained additional video and correlation video. The fixed network may be of the broadcasting network. The fixed receiver may provide a 3D service by synthesizing the additional video and the base video.

When the additional video and the base video are synthesized, for synchronizing the additional video and the base video, the signaling information may be separately transmitted by the apparatus 100 for transmitting 3DTV broadcasting. The signaling information may include a reproduction time of the base video, a reproduction time of the additional video, and error information between the reproduction time of the base video and the reproduction time of the additional video.

Figure 5:
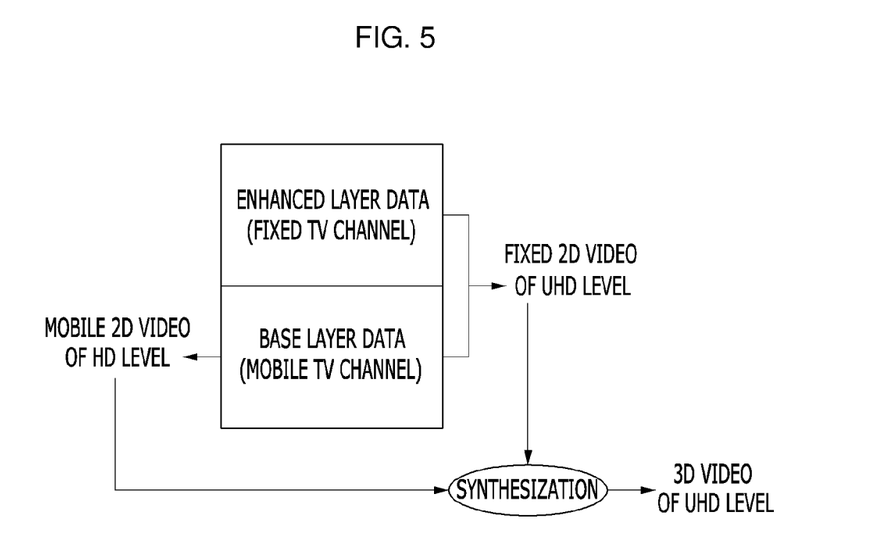
FIG. 5 is views showing a concept of 3DTV services according to an exemplary embodiment of the present invention.

FIG. 5 is views showing a concept of 3DTV services according to an exemplary embodiment of the present invention.

Referring to FIG. 5, the base layer data of the additional video is generated, and the enhancement layer data corresponding to the correlation video between the additional video and the base video is generated. The base layer data and the enhancement layer data are transmitted to the mobile TV channel of a mobile network and the fixed TV channel of the fixed network, respectively.

Then, since the apparatus 300 for receiving 3DTV broadcasting corresponding to the mobile receiver can only receive the base layer data, it obtains the additional video from the base layer data, and provides a mobile 2D video of an HD level using the additional video.

Meanwhile, the apparatus 300 for receiving 3DTV broadcasting corresponding to the fixed receiver can receive both the base layer data and the enhancement layer data. Thus, the apparatus 300 for receiving 3DTV broadcasting corresponding to the fixed receiver may obtain the additional video from the base layer data, may obtain the correlation video using the enhanced layer data, and then may obtain the base video using the obtained additional video and correlation video. The apparatus 300 for receiving 3DTV broadcasting may provide a 2D video of a UHD level using only the base video, and may provide a 3D video of a UHD level using the additional video and the base video, according to a selection of the user.

As described above, according to the exemplary embodiment of the present invention, even if the apparatus 100 is not transmitted the base video, the apparatus 300 for receiving 3DTV broadcasting may provide the 3D service.

Exemplary embodiments of the present invention described above are not implemented through only the apparatus and/or the method described above, but may also be implemented through a program executing functions corresponding to configurations of exemplary embodiments of the present invention or a recording medium in which the program is recorded. In addition, this implementation may be easily made by those skilled in the art to which the present invention pertains from exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for providing a video service, comprising:
selecting a base video and an additional video from a left view and a right view of a 3D (three-dimensional) video to provide a low resolution 2D (two-dimensional) video service, a high resolution 2D video service, and a 3D video service, simultaneously;
performing down-sampling to the additional video;
generating base layer stream for the low resolution 2D video service by coding the down-sampled additional video to be used as a view of the 3D video in a receiving apparatus;
generating enhancement layer stream for the high resolution 2D video service by coding the base video using a correlation between the base video and an up-sampled additional video, wherein the up-sampled additional video is generated by performing up-sampling to the down-sampled additional video and the base video is used as another view of the 3D video in the receiving apparatus; and
transmitting the base layer stream and the enhancement layer stream to the receiving apparatus.

2. The method of claim 1, wherein: the transmitting of the base layer stream and the enhancement layer stream to the receiving apparatus includes:
multiplexing the base layer stream and the enhancement layer stream into a transport stream (TS); and
transmitting the transport stream through a communication network.

3. The method of claim 1, wherein the transmitting of the base layer stream and the enhancement layer stream to the receiving apparatus includes:
transmitting the base layer stream through a first physical layer pipe (PLP) corresponding to the first 2D (two-dimensional) video service; and
transmitting the enhancement layer stream through a second PLP corresponding to a second 2D video service.

4. The method of claim 3, wherein: the first 2D video service corresponds to a mobile TV channel and the second 2D video service corresponds to a fixed TV channel.

5. The method of claim 1, wherein the transmitting of the base layer stream and the enhancement layer stream to the receiving apparatus includes:
modulating the base layer stream according to a first modulation scheme having relatively low modulation rate; and
modulating the enhancement layer stream according to a second modulation scheme having relatively high modulation rate.

6. The method of claim 1, wherein the selecting of the base video and the additional video includes: selecting the left video of the 3D video as the base video; and selecting the right video of the 3D video as the additional video.

7. A method for receiving a video service, comprising:
receiving base layer stream in which a down-sampled additional video is coded by a transmitting apparatus, wherein the down-sampled additional video is generated by performing down-sampling to an additional video selected from a 3D (three-dimensional) video by the transmitting apparatus;

receiving enhancement layer stream in which a base video is coded by the transmitting apparatus, wherein the base video is selected from the 3D video;

decoding the base layer stream to obtain the down-sampled additional video;

performing up-sampling to the down-sampled additional video to generate an up-sampled additional video;

decoding the enhancement layer stream to obtain the base video; and obtaining the 3D video by synthesizing the base video and the up-sampled additional video.

8. The method of claim 7, wherein: the receiving of base layer stream includes receiving the base layer stream through a first transmission channel; and the receiving of the enhancement layer stream includes receiving the enhancement layer stream through a second transmission channel.

9. The method of claim 7, further comprising:
providing a low resolution 2D (two-dimensional) video service to a user by using the down-sampled additional video obtained from the base layer stream.

10. The method of claim 7, further comprising:
providing a high resolution 2D (two-dimensional) video service to a user by using the down-sampled additional video from the base layer stream and a correlation between the base video and the up-sampled additional video.

11. The method of claim 7, wherein the base video is used as a left view of the 3D video and the up-sampled additional video is used as a right view of the 3D video.

12. The method of claim 7, wherein the base layer stream and the enhancement layer stream are received through a broadcasting network.

13. The method of claim 7, wherein the base layer stream and the enhancement layer stream are received through a communication network.

14. An apparatus for receiving a video service, comprising:
a receiver configured to receive base layer stream in which a down-sampled additional video is coded by a transmitting apparatus and enhancement layer stream in which a base video is coded by the transmitting apparatus, wherein the down-sampled additional video is generated by performing down-sampling to an additional video selected from a 3D (three-dimensional) video by the transmitting apparatus and the base video is selected from the 3D video;

a scalable decoder configured to decode the base layer stream for obtaining the down-sampled additional video, perform up-sampling to the down-sampled additional video for generating an up-sampled additional video, and decode the enhancement layer stream for obtaining the base video; and a reproducer configured to obtain the 3D video by synthesizing the base video and the up-sampled additional video.

15. The apparatus of claim 14, wherein the reproducer further configured to:
provide a low resolution 2D (two-dimensional) video service to a user by using the down-sampled additional video obtained from the base layer stream.

16. The apparatus of claim 14, wherein the reproducer further configured to:
provides a high resolution 2D (two-dimensional) video service to a user by using the down-sampled additional video from the base layer stream and a correlation between the base video and the up-sampled additional video.

17. The apparatus of claim 14, wherein the base video is used as a left view of the 3D video and the up-sampled additional video is used as a right view of the 3D video.

18. The apparatus of claim 14, wherein the base layer stream and the enhancement layer stream are received through a broadcasting network by the receiver.

19. The apparatus of claim 14, wherein the base layer stream and the enhancement layer stream are received through a communication network by the receiver.

* * * * *